United States Patent
Ariyama (10) Patent No.: US 9,141,857 B2
(45) Date of Patent: Sep. 22, 2015

(54) IMAGE PROCESSING DEVICE, IMAGE PROCESSING METHOD, COMPUTER PROGRAM AND COMPUTER-READABLE RECORDING MEDIUM

(71) Applicant: Sony Corporation, Tokyo (JP)

(72) Inventor: Takaaki Ariyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 13/756,764

(22) Filed: Feb. 1, 2013

(65) Prior Publication Data

US 2013/0202209 A1 Aug. 8, 2013

(30) Foreign Application Priority Data

Feb. 8, 2012 (JP) ................. 2012-024775

(51) Int. Cl.
*G06K 9/40* (2006.01)
*G06K 9/00* (2006.01)
*G06K 9/03* (2006.01)

(52) U.S. Cl.
CPC ............ *G06K 9/00624* (2013.01); *G06K 9/036* (2013.01)

(58) Field of Classification Search
CPC ..... G06K 9/036; G06K 9/00624; G06K 9/00; G06K 9/2054; G06K 7/146; G06T 2207/10016; G06T 7/0083

USPC ......... 382/167, 181, 190, 254, 274, 275, 305, 382/312; 358/1.9
See application file for complete search history.

(56) References Cited

U.S. PATENT DOCUMENTS

| | | | | |
|---|---|---|---|---|
| 7,511,853 | B2* | 3/2009 | Nakami | 358/1.9 |
| 7,542,588 | B2* | 6/2009 | Ekin et al. | 382/103 |
| 8,649,625 | B2* | 2/2014 | Tsukada | 382/254 |
| 2011/0032432 | A1* | 2/2011 | Lee | 348/700 |

FOREIGN PATENT DOCUMENTS

| JP | 2000-069416 A | 3/2000 |
|---|---|---|
| JP | 2009-194437 A | 8/2009 |

* cited by examiner

*Primary Examiner* — Sheela Chawan
(74) *Attorney, Agent, or Firm* — Hazuki International, LLC

(57) ABSTRACT

There is provided an image processing device including an image quality configuring part configured to configure image quality on a per-recognizable scene of an image basis according to an instruction from a user, an image quality storage configured to store the image quality configured for each scene, an image recognition part configured to recognize a scene of an image to be acquired, and an image processing part configured to perform image processing on the image based on the image quality configured for the recognized scene by the image quality configuring part.

13 Claims, 7 Drawing Sheets

IMAGE PROCESSING DEVICE, IMAGE PROCESSING METHOD, COMPUTER PROGRAM AND COMPUTER-READABLE RECORDING MEDIUM

BACKGROUND

The present disclosure relates to an image processing device, an image processing method, a computer program and a computer-readable recording medium.

Image capturing devices which can recognize status of the subject whose image is to be captured are increasing recent years. Such image capturing devices perform preset camera control and signal processing according to individual scenes such as a landscape, a person and a night scene whose images are to be captured.

SUMMARY

However, camera control and signal processing preset in existing image capturing devices do not reflect intentions of users, but are merely designed by individual designers of manufacturers of the image capturing devices. For example, Japanese Patent Application Publication No. 2000-069416 discloses a digital camera which can acquire an image having picture imagery of preference by the user designating the imagery for image generation with designation tools. However, the digital camera according to Japanese Patent Application Publication No. 2000-069416 acquires images having the same picture imagery for all the scenes and is significantly difficult to configure settings of user's preference for each scene.

Therefore, the present disclosure proposes an image processing device, an image processing method, a computer program and a computer-readable recording medium which are novel and improved and using which the user can configure images of preference for individual scenes.

According to an embodiment of the present disclosure, there is provided an image processing device including an image quality configuring part configured to configure image quality on a per-recognizable scene of an image basis according to an instruction from a user, an image quality storage configured to store the image quality configured for each scene, an image recognition part configured to recognize a scene of an image to be acquired, and an image processing part configured to perform image processing on the image based on the image quality configured for the recognized scene by the image quality configuring part.

Further, according to another embodiment of the present disclosure, there is provided an image processing method including configuring image quality on a per-recognizable scene of an image basis according to an instruction from a user, recognizing a scene of an image to be acquired, and performing image processing on the image based on the image quality configured for the recognized scene.

Further, according to another embodiment of the present disclosure, there is provided a computer program causing a computer to function as an image processing device including an image quality configuring part configured to configure image quality on a per-recognizable scene of an image basis according to an instruction from a user, and configured to record the image quality in an image quality storage configured to store the image quality configured for each scene, an image recognition part configured to recognize a scene of an image to be acquired, and an image processing part configured to perform image processing on the image based on the image quality configured for the recognized scene by the image quality configuring part.

Further, according to another embodiment of the present disclosure, there is provided a computer-readable recording medium having a program recorded therein, the program causing a computer to function as an image processing device including an image quality configuring part configured to configure image quality on a per-recognizable scene of an image basis according to an instruction from a user, and configured to record the image quality in an image quality storage configured to store the image quality configured for each scene, an image recognition part configured to recognize a scene of an image to be acquired, and an image processing part configured to perform image processing on the image based on the image quality configured for the recognized scene by the image quality configuring part.

As described above, according to the embodiments of the present disclosure, the user can configure images of preference for individual scenes.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, description is made in the following order.
1. Schematic Configuration of Image Capturing Device
2. Image Capturing Processing of Image Capturing Device
2-1. Configuring Processing of Image Quality
2-2. Image Acquisition Processing in Image Capturing
3. Exemplary Configuration of Hardware <1. Schematic Configuration of Image Capturing Device>

Figure 1:
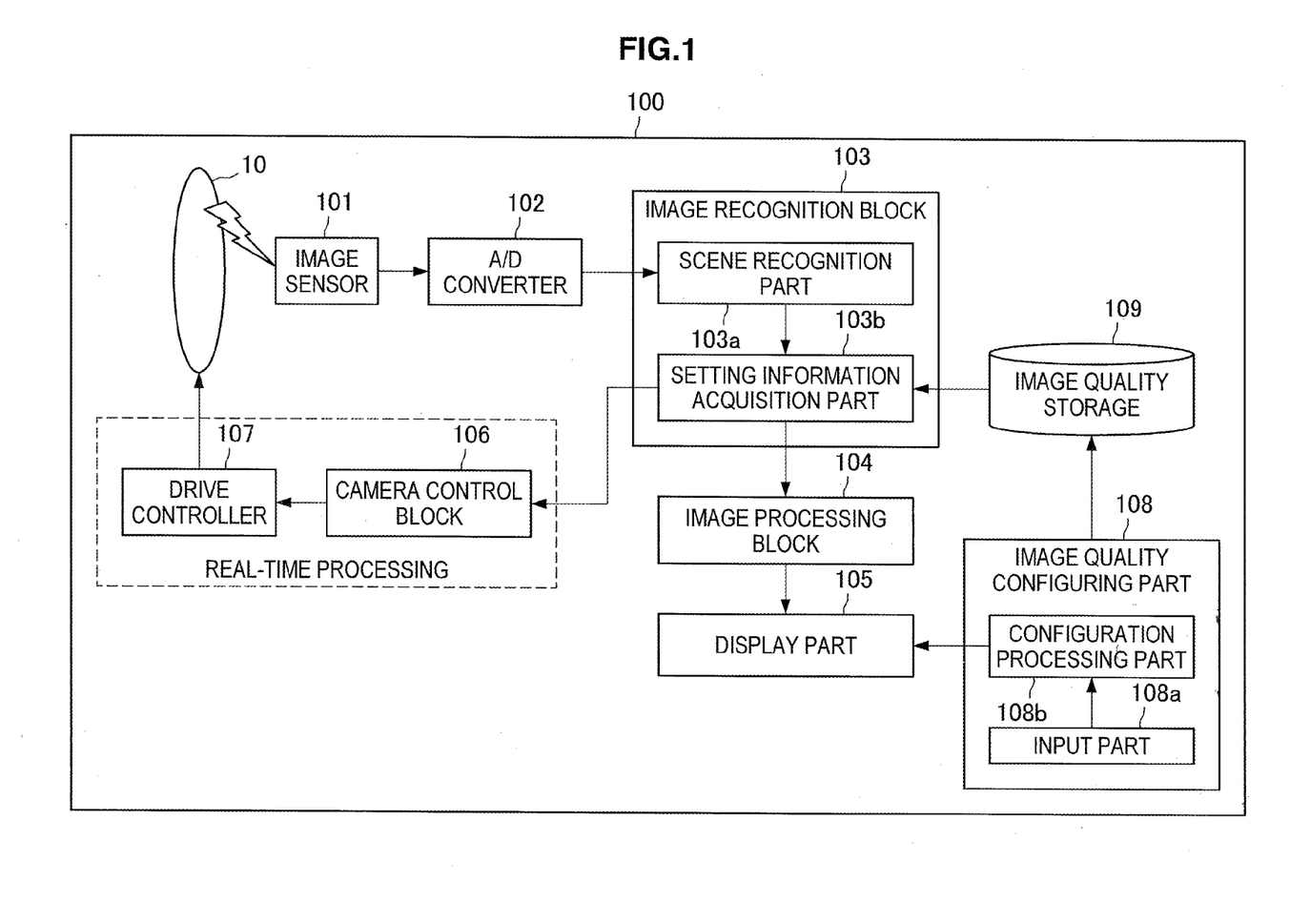
FIG. 1 is a block diagram illustrating a schematic configuration of an image capturing device according to an embodiment of the present disclosure.

At first, a schematic configuration of an image capturing device 100 according to an embodiment of the present disclosure is described with reference to FIG. 1. In addition, FIG. 1 is a block diagram illustrating a schematic configuration of an image capturing device 100 according to the embodiment.

The image capturing device 100 according to the embodiment is an image recording device such, for example, as a digital still camera and a camcorder. As illustrated in FIG. 1, the image capturing device 100 includes an image sensor 101, an A/D converter 102, an image recognition block 103, an image processing block 104, a display part 105, a camera control block 106 and a drive controller 107. Furthermore, the image capturing device 100 includes an image quality configuring part 108 and an image quality storage 109.

The image sensor 101 is an element on which light of the subject concentrated with a lens 10 is imaged. The image sensor 101 can employ a CMOS (Complementary Metal Oxide Semiconductor) image sensor, a CCD (Charge Coupled Device) image sensor or the like, for example. The image sensor 101 converts the light which is imaged on the relevant element and to be an image into electricity, and outputs it to the A/D converter 102.

The A/D converter 102 converts analog information thus obtained from the image sensor 101 into digital information, and outputs it to the image recognition block 103.

The image recognition block 103 includes a scene recognition part 103*a* demodulating the digital information thus inputted from the A/D converter 102 to recognizes in what kind of scene the user is performing image capturing, and a setting information acquiring part 103*b* acquiring setting information of image quality corresponding to the recognized scene. Scenes to be recognized by the image recognition block 103 include a face, a landscape, a night scene, a beach, snow (ski slopes or snow scenery) and the like, for example. The image recognition block 103 acquires setting values of constituents of image quality from the image quality storage 109, which is mentioned later, using the setting information acquiring part 103*b* based on the scene of an image which scene is recognized by the scene recognition part 103*a*, and outputs them to the image processing block 104 along with the digital information.

The image processing block 104 performs signal processing in the setting values of image quality corresponding to the scene acquired by the image recognition block 103. The image processing block 104 performs processing such, for example, as gradation representation, color reproduction (chroma and hue), white balance, edge enhancement, noise reduction. The image processing block 104 displays the image obtained by performing the signal processing on the display part 105.

The display part 105 is an output part displaying an image, and can employ a liquid crystal display, an organic EL display or the like, for example.

The camera control block 106 performs camera control such as exposure control and aperture stop control in the setting values of image quality corresponding to the scene acquired by the image recognition block 103. The camera control block 106 outputs control information for controlling the lens 10 and the like to the drive controller 107. The drive controller 107 controls a driving part (not shown) driving the lens 10 and the like based on the control information thus inputted from the camera control block 106. The camera control block 106 and drive controller 107 perform real-time processing.

The image quality configuring part 108 is an input configuration part configuring image quality of user's preference according to instruction from the user for individual scenes recognizable by the image capturing device 100. The image quality configuring part 108 can be configured of an input part 108*a* such, for example, as a touch panel, and a configuration processing part 108*b* configuring image quality for each scene based on input information from the input part 108*a* to record it in the image quality storage 109 mentioned later. Based on the image quality configured by the image quality configuring part 108, the image processing block 104 performs the image processing. Moreover, based on the image quality configured by the image quality configuring part 108, the camera control block 106 performs the camera control.

The image quality storage 109 stores setting information of image quality for each scene which information is configured by the image quality configuring part 108. Moreover, the image quality storage 109 can also record setting information of image quality for each scene for each user. The setting information of image quality stored in the image quality storage 109 is acquired by the image recognition block 103, and is used for the signal processing in the image processing block 104 and the camera control in the camera control block 106. In addition, the image quality storage 109 stores setting information of image quality (default values) preset in the image capturing device 100 along with the setting information of image quality for each scene which information is configured by the user. The default values are used for configuration of image quality in case of the image capturing device 100 not being able to perform scene recognition or the like.

<2. Image Capturing Processing of Image Capturing Device>

Next, image capturing processing of the image capturing device 100 according to the embodiment is described. The image capturing device 100 according to the embodiment can configure an image of user's preference for each recognizable scene, and can acquire an image in image quality configured according to a scene recognized from a captured image. For the purpose, at first, the user configures image quality for each scene recognizable by the image capturing device 100. The image capturing device 100 recognizes the subject in image capturing, and for a scene to which image quality is configured, acquires an image based on the settings.

Figure 2:
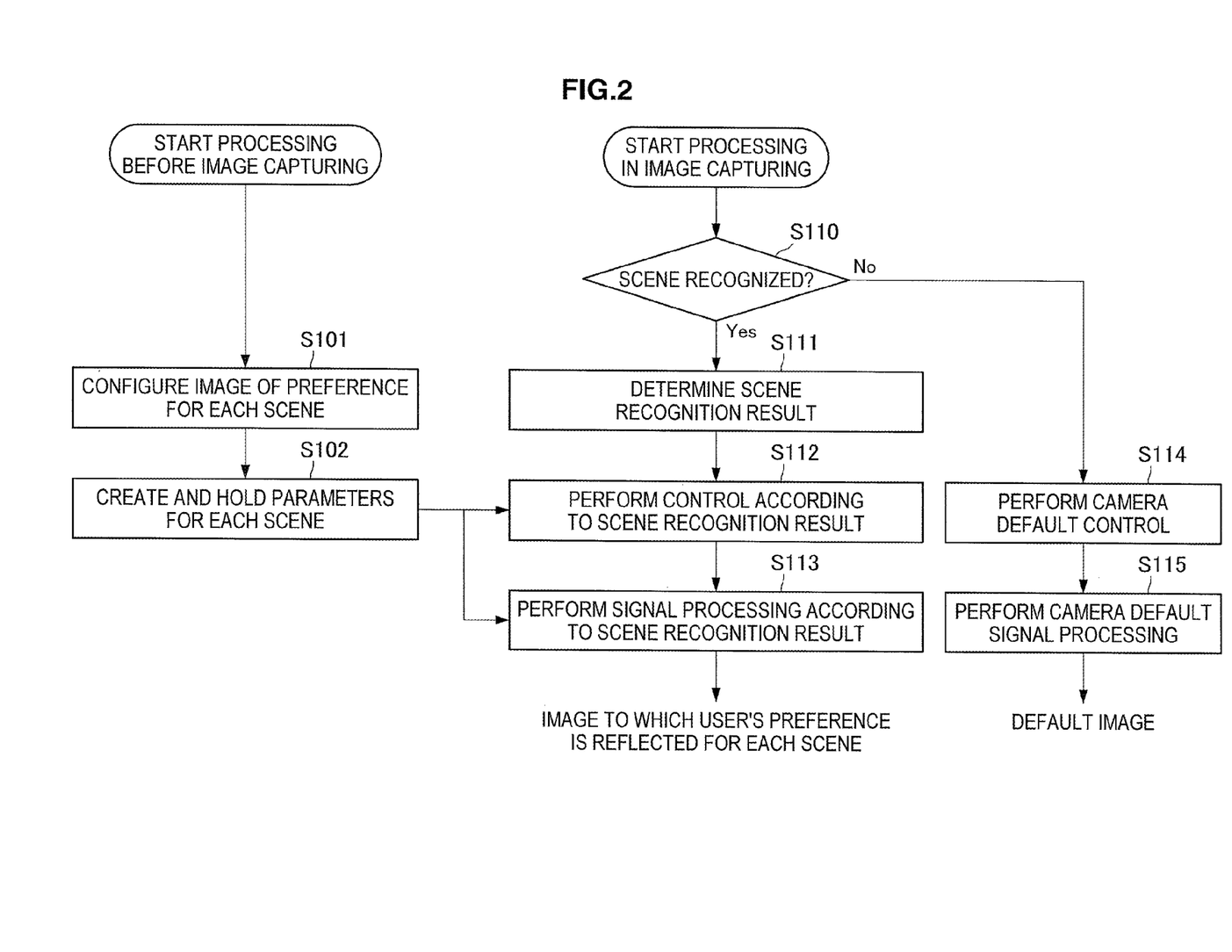
FIG. 2 is a flowchart illustrating image capturing processing of the image capturing device according to the same embodiment.
Figure 3:
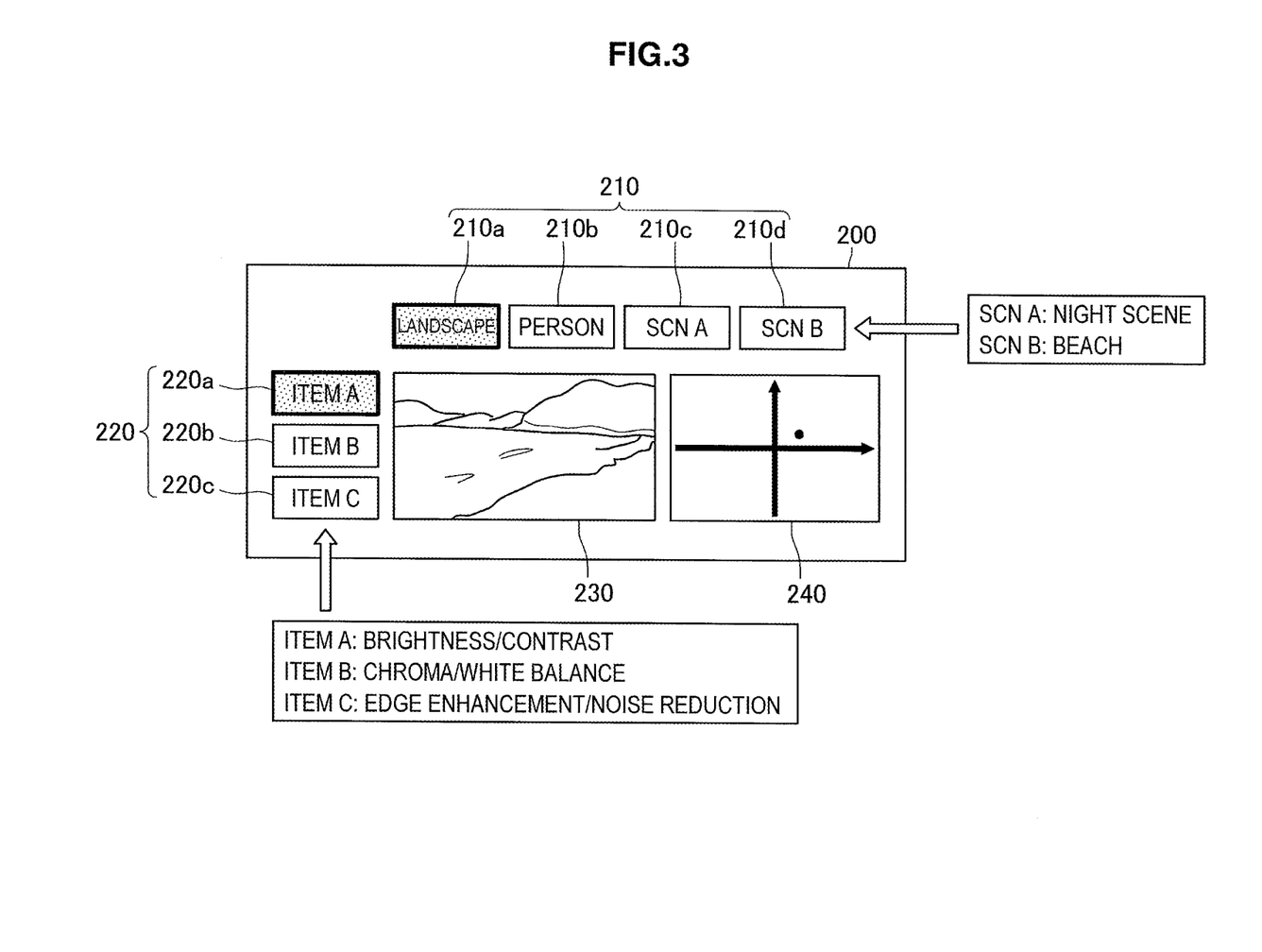
FIG. 3 is an explanatory drawing illustrating configuring processing of setting information in an image quality configuring part.
Figure 4:
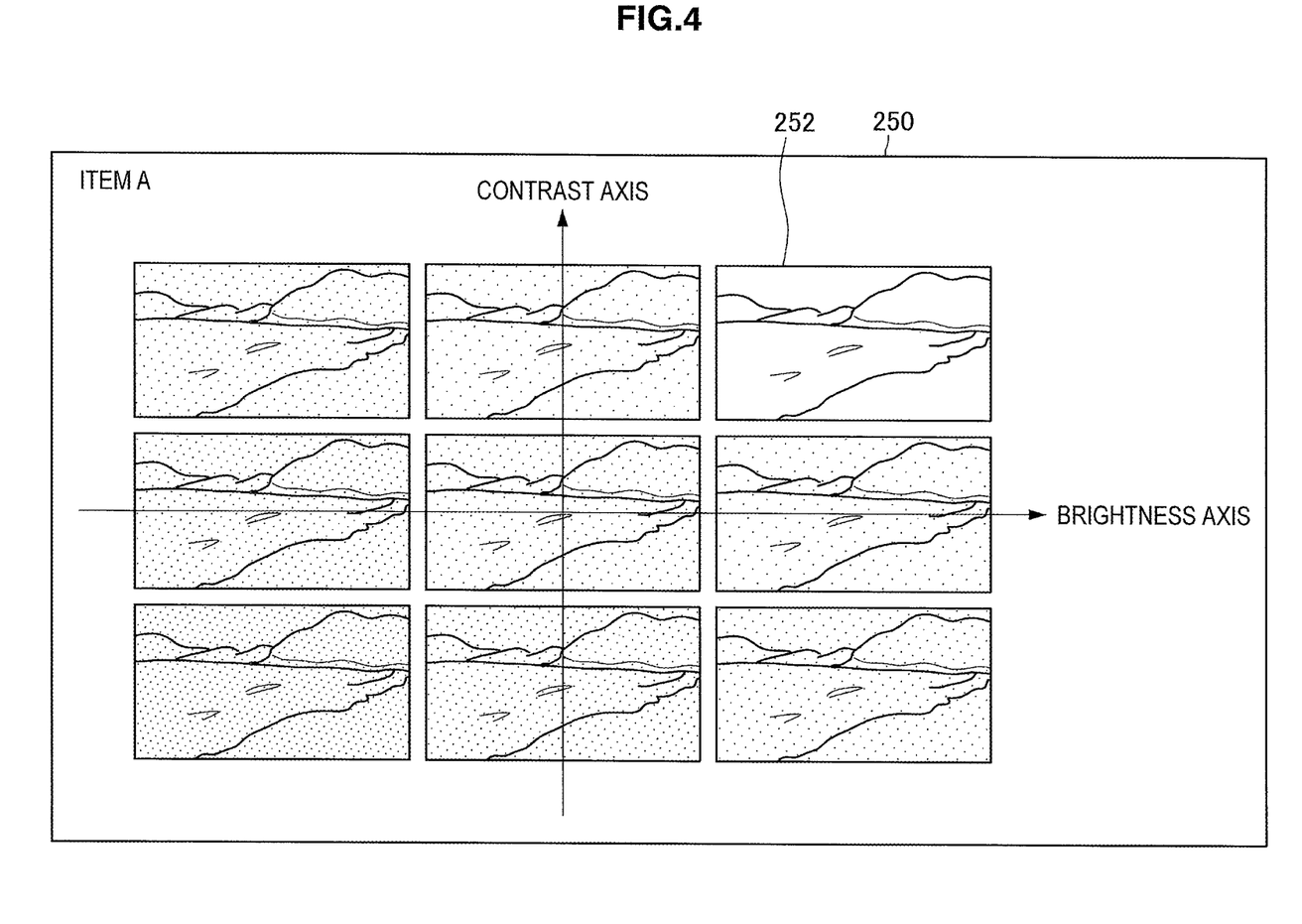
FIG. 4 is an explanatory drawing illustrating one example of a setting screen for configuring constituents of image quality.
Figure 5:
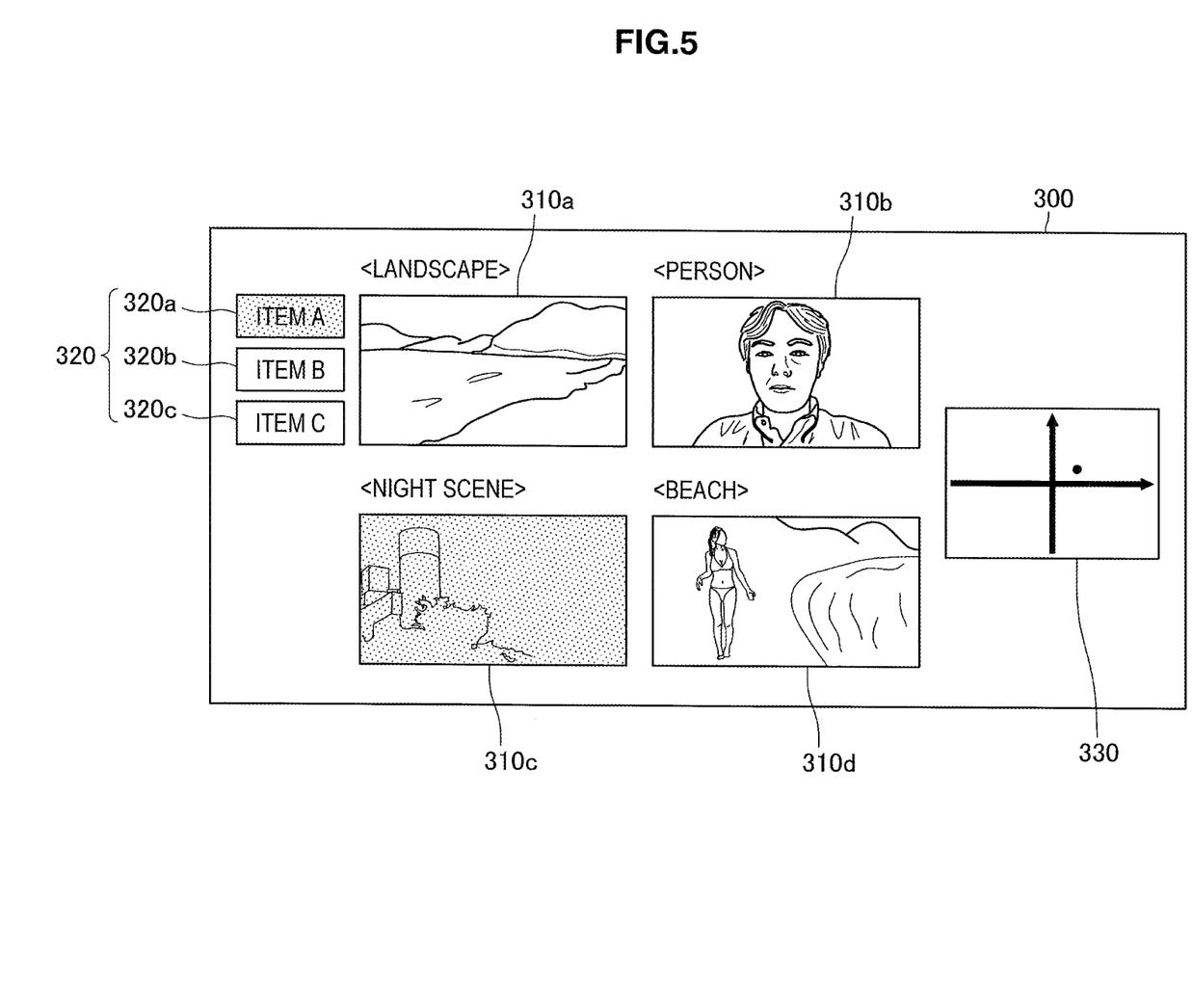
FIG. 5 is an explanatory drawing illustrating another example of a setting screen for configuring constituents of image quality.
Figure 6:
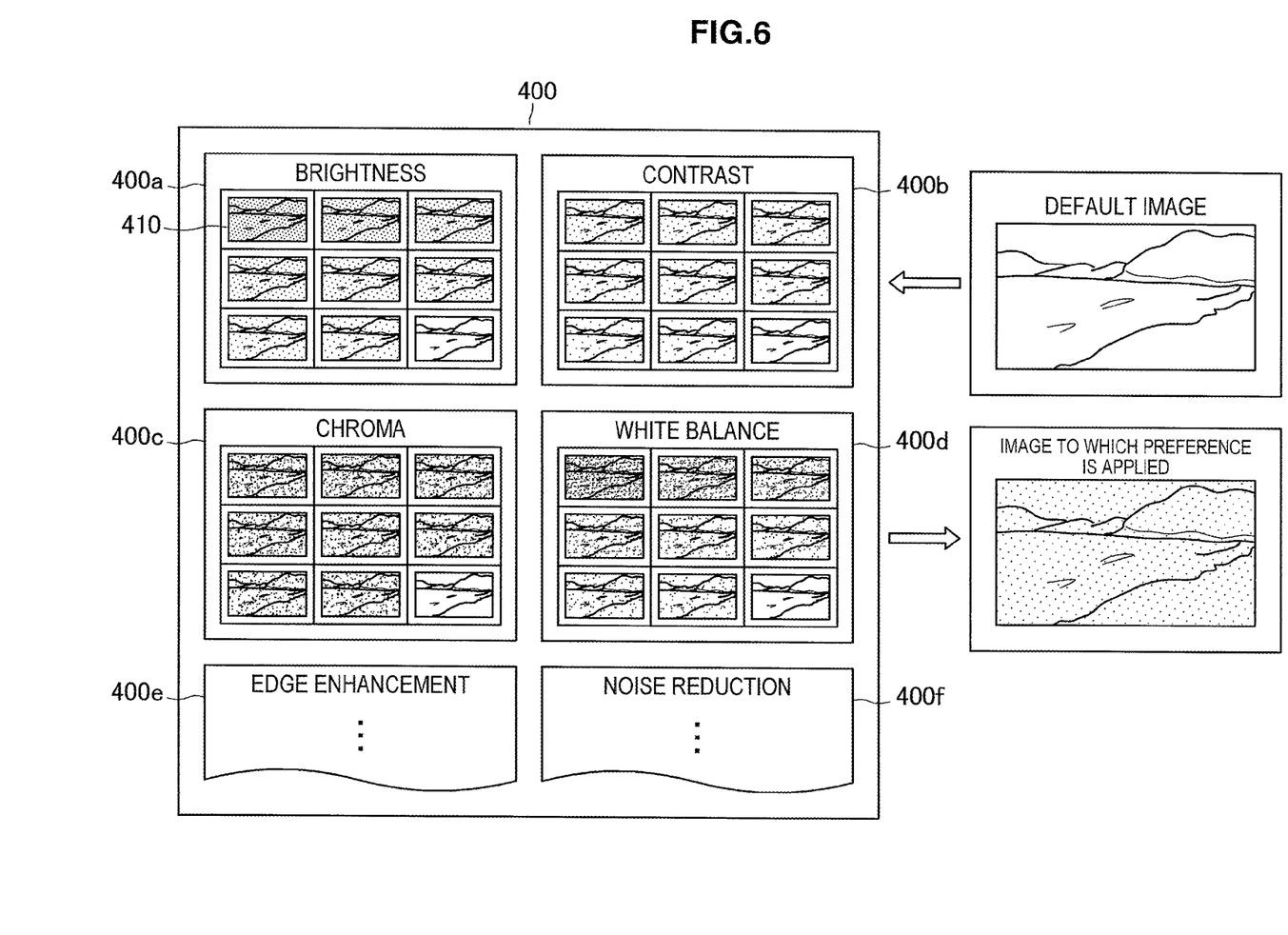
FIG. 6 is an explanatory drawing illustrating another example of a setting screen for configuring constituents of image quality.

Hereinafter, based on FIG. 2 to FIG. 6, configuring processing of image quality and image acquisition processing in image capturing as the image capturing processing of the image capturing device 100 are described. In addition, FIG. 2 is a flowchart illustrating image capturing processing of the image capturing device 100 according to the embodiment of the present disclosure. FIG. 3 is an explanatory drawing illustrating configuring processing of setting information in the image quality configuring part 108. FIG. 4 is an explanatory drawing illustrating one example of a setting screen on which configuring constituents of image quality is performed. FIG. 5 and FIG. 6 are explanatory drawings illustrating another example of a setting screen on which configuring constituents of image quality is performed.

[2-1. Configuring Processing of Image Quality]

At first, the configuring processing of configuring constituents of image quality for each scene (S101 and S102) is described. As illustrated in FIG. 2, this configuring processing is previously performed before image capturing. At first, the user configures an image of preference for each scene recognizable by the image capturing device 100 using the image quality configuring part 108 of the image capturing device 100 (S101). Such recognizable scenes include, for example, a face, a landscape, a night scene, a beach, snow (ski slopes or snow scenery) and the like as mentioned above. Moreover, constituents of the image include, for example, brightness, contrast, chroma, white balance, edge enhancement, noise reduction and the like.

Specifically, the constituents of the image can be configured using a touch panel provided as an input part 108*a* in the image capturing device 100, for example, in an operation screen 200 illustrated in FIG. 3. The touch panel illustrated in FIG. 3 is provided on the display part 105, and the user can perform processes according to contact positions and input operations by touching and operating individual objects in the display screen 200 displayed on the display part 105.

The operation screen 200 in FIG. 3 is provided with a scene selection part 210 for, in configuring image quality, selecting each scene recognizable by the image capturing device 100 and a constituent selection part 220 for selecting constituents of image quality to be configured. Furthermore, the operation screen 200 is provided with a representative image display area 230 for indicating a representative image for the scene in configuring and an adjustment palette 240 for adjusting the constituents of image quality to be configured.

The scene selection part 210 includes scene buttons for selecting a scene to be configured. As illustrated in FIG. 3, the scene buttons include, for example, a "landscape" button (210a) selected when configuring image quality of a landscape and a "person" button (210b) selected when configuring image quality of a person, and other than these, can also include a "SCN A" button (210c) and a "SCN B" button (210d) corresponding to other scenes. Such other scenes include, for example, a night scene, a beach and the like as mentioned above.

The constituent selection part 220 includes setting item buttons for selecting constituents of image quality to be configured. As illustrated in FIG. 3, the setting item buttons include, for example, an "item A" button 220a, an "item B" button 220b and an "item C" button 220c. In the embodiment, two constituents can be adjusted for each setting item simultaneously. For example, brightness and contrast can be adjusted for the item A, chroma and white balance can be adjusted for the item B, and edge enhancement and noise reduction can be adjusted for the item C. The adjustment of the constituents of image quality is performed using the adjustment palette 240 mentioned later. In addition, the present technology is not limited to such examples of the constituent selection part 220, but this part may enable adjustment of only one constituent or may be able to adjust three or more items simultaneously, for each setting item.

The representative image display area 230 is a region where a representative image for each scene is displayed. The representative image is a typical image which is for each scene and is beforehand registered, and is used for notifying, to the user, picture imagery of the image acquired based on change in image quality in configuring image quality for each scene. The image in the representative image display area 230 is changed by the configuration processing part 108b according to change in settings of constituents of image quality.

The adjustment palette 240 is an input area for adjusting constituents of image quality to be configured. For example, when two constituents can be adjusted for each setting item in the constituent selection part 220 simultaneously, the adjustment palette 240 can be configured as two-dimensional coordinates in which the horizontal axis and the vertical axis are assigned to setting values of the respective constituents as illustrated in FIG. 3. Specifically, when the "item A" is adjusted, for example, the horizontal axis is assigned to the setting value of brightness and the vertical axis is assigned to the setting value of contrast. The configuration processing part 108b acquires the setting values of the constituents of image quality corresponding to positions designated by the user on the adjustment palette 240, and changes, in real time, the image quality of the image displayed in the representative image display area 230 based on the relevant setting values.

In addition, in place of the adjustment palette 240 illustrated in FIG. 3, for example, a adjustment screen 250 illustrated in FIG. 4 may be displayed in adjusting image quality. Similarly to the adjustment palette 240 in FIG. 3, when two constituents can be adjusted for each setting item in the constituent selection part 220 simultaneously, the adjustment screen 250 can be configured as two-dimensional coordinates in which the horizontal axis and the vertical axis are assigned to setting values of the respective constituents. At this stage, a plurality of patterns of representative images for which the setting values of the respective constituents are changed are arranged into a matrix shape. For example, in FIG. 4, images brighter are arranged as they go to the right on the horizontal axis for which image brightness is configured, and images stronger in contrast as they go to the top on the vertical axis for which image contrast is configured, corresponding to the two-dimensional coordinates. Thereby, the user is easy to grasp picture imagery of the image after the change in adjusting the setting values and operation performance is improved.

The user selects a scene for which image quality is to be configured using the scene selection part 210 in the operation screen 200 illustrated in FIG. 3, and selects constituents of image quality to be configured for the selected scene using the constituent selection part 220. This enables adjustment of the constituents of image quality for the scene, which is selected using the scene selection part 210, using the adjustment palette 240. Determination of setting values of the constituents may include allowing the user to determine affirmative or negative of the change with a pop-up screen displayed for confirming the affirmative or negative of the change, for example, when the user pushes another scene button in the scene selection part 210 or pushes another setting item button in the constituent selection part 220. Otherwise, a determination button for determining the setting values after the change or a cancel button for cancelling the change may be provided in the operation screen 200 or the adjustment screen 250.

Returning to the description of FIG. 2, in step S101, after image quality for a certain scene is configured and determined using the operation screen 200 in FIG. 3 or the adjustment screen 250 in FIG. 4, the configuration processing part 108b records setting values after change of individual constituents of the image in the image quality storage 109 (S102). At this stage, the image quality storage 109 stores the setting values of the constituents of image quality for each scene.

As above, the configuring processing of configuring constituents of image quality for each scene is described. In addition, the operation screen 200 in FIG. 3 or the adjustment screen 250 in FIG. 4 is indicated as the input part 108a of the image quality configuring part 108 configuring image quality for each scene, whereas the present technology is not limited to such examples. For example, image quality for each scene can also be adjusted using an operation screen 300 as illustrated in FIG. 5 or an adjustment screen 400 illustrated in FIG. 6.

In the operation screen 300 illustrated in FIG. 5, representative images 310a to 310d for individual scenes which can be configured are displayed, and the scene to be adjusted can be determined by selecting the representative images 310a to 310d. Similarly to FIG. 3, the operation screen 300 is provided with a constituent selection part 320 including setting item buttons for selecting constituents of image quality to be configured, and the constituents of image quality to be adjusted for the selected scene can be selected using the setting item buttons 320a to 320c. The selected constituents of image quality can also be adjusted using an operation palette 330 similarly to FIG. 3. The configuration processing part 108b changes image quality of the representative image for the scene in configuring based on setting values of the respective constituents at a designated position according to the position which the user designates on the operation palette 330. Thereby, the user can confirm picture imagery in case of the setting values to be changed as the representative image, operating the operation palette 330.

Moreover, in an adjustment screen 400 illustrated in FIG. 6, a plurality of changing candidate images 410 obtained by changing setting values of a representative image for a scene to be configured, for each constituent of image quality, are displayed, and image quality is configured by selecting a desired picture imagery from the plurality of changing candidate images 410. For example, an adjustment screen 400a for brightness, an adjustment screen 400b for contrast, an adjustment screen 400c for chroma, an adjustment screen 400d for white balance, an adjustment screen 400e for edge enhancement, an adjustment screen 400f noise reduction and the like are displayed sequentially, and setting values of the respective constituents are determined sequentially. At this stage, the configuration processing part 108b fixes, for the constituent to which the setting value has been determined, the relevant setting value, and generates changing candidate images 410 to be presented in the adjustment screen 400 for the next constituent.

Accordingly, in case of adjusting brightness of the image at first, a plurality of changing candidate images 410 obtained by changing the setting value for brightness relative to the default image of a representative image for a scene to be configured are displayed in the adjustment screen 400a for brightness. In case of configuring contrast next, a plurality of changing candidate images 410 obtained by fixing the setting value for brightness, which has been configured using the adjustment screen 400a for brightness, and changing the setting value for contrast are displayed in the adjustment screen 400b for contrast. Thus, sequential determination of the setting values of the respective constituents using the respective adjustment screens 400 generates the setting information of image quality of user's preference eventually. The configuration of image quality using the adjustment screen 400 in FIG. 6 is performed for each scene.

[2-2. Image Acquisition Processing in Image Capturing]

Next, image acquisition processing in image capturing (S110 to S115) is described. In image capturing, the image capturing device 100, at first, determines whether or not scene recognition processing of recognizing a scene for which an image is to be captured in the scene recognition part 103a of the image recognition block 103 is performed (S110). The presence or absence of performing the scene recognition processing can be determined from performing processing information for managing processing performed by the image capturing device 100.

When the image capturing device 100 performs the scene recognition processing, the scene recognition part 103a determines a scene for which an image is about to be captured with the scene recognition processing using a technique for recognizing a scene of the subject (for example, see Japanese Patent Application Publication No. 2009-194437) (S111). Japanese Patent Application Publication No. 2009-194437 mentions a scene recognition technique of extracting concentration values of R, G and B in a captured image generated by capturing an image of the subject according to image capturing parameters configured, and determining a scene candidate of the subject based on individual averages of the concentration values of R, G and B.

Once the scene for which an image is about to be captured is recognized by the scene recognition part 103a in step S110, the image recognition block 103 acquires setting information of image quality corresponding to the recognized scene from the image quality storage 109 using the setting information acquiring part 103b. Then, the setting information acquiring part 103b outputs the acquired setting information of image quality to the image processing block 104 and camera control block 106. After that, the camera control block 106 performs camera control based on the setting information thus inputted, and captures the image of the subject (S112). Moreover, the image processing block 104 performs signal processing on the image based on the setting information thus inputted, and displays the image of the subject, which is about to be captured, on the display part 105 (S113). Thereby, the image capturing device 100 can acquire and present the image in which the user's preference is reflected for each scene.

On the other hand, when any scene for which an image is about to be captured is not recognized by the scene recognition part 103a in step S110, the image recognition block 103 acquires default values of image quality from the image quality storage 109 using the setting information acquiring part 103b. Then, the setting information acquiring part 103b outputs the acquired default values of image quality to the image processing block 104 and camera control block 106. After that, the camera control block 106 performs camera control based on the default values thus inputted, and captures the image of the subject (S114). Moreover, the image processing block 104 performs signal processing on the image based on the default values thus inputted, and displays the image of the subject, which is about to be captured, on the display part 105 (S115).

As above, the image capturing processing using the image capturing device 100 according to the embodiment is described. According to the image capturing device 100 according to the embodiment, when the scene recognition is performed, an image can be acquired according to the scene recognition result based on the setting information of image quality beforehand configured by the user. Therefore, an image in which the user's preference is reflected for each scene can be acquired.

Moreover, when image information of the acquired image is associated with preference (settings of image quality) in which the image is captured, a tendency of the user's preference for each scene can also be grasped on the occasion of the captured image uploaded on a server. Collecting and analyzing tendencies of preference of image quality for individual scenes can be utilized for the determination or the like of default values of image quality in the image capturing device 100.

Furthermore, a communication part (not shown) of transmitting and receiving information to and from the image capturing device 100 may be provided, and setting information of image quality for each scene which is configured by each user may be communicated between different image capturing devices 100. Thereby, when having found an image of preference captured by another user, the user can omit a step of configuring image quality for the relevant scene in the image quality configuring part 108, by obtaining setting information of image quality for the relevant scene by transmitting it between the image capturing devices 100.

<3. Exemplary Configuration of Hardware>

Figure 7:
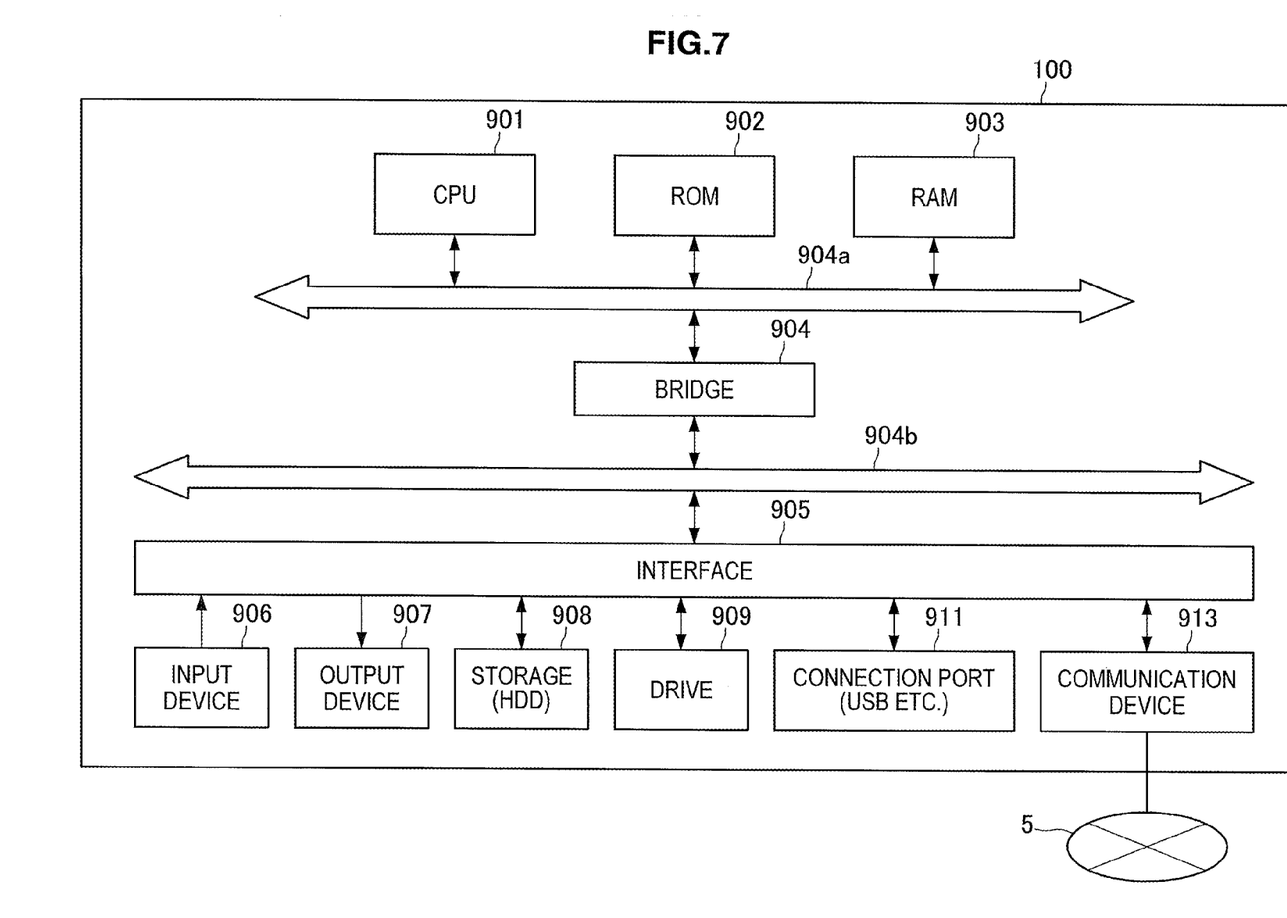
FIG. 7 is a block diagram illustrating one exemplary configuration of hardware of an image capturing device according to the embodiment.

The processing performed by the image capturing device 100 according to the embodiment can also be performed by hardware or can also be performed by software. In such cases, the image capturing device 100 can also be configured as illustrated in FIG. 7. Hereinafter, one exemplary configuration of hardware of the image capturing device 100 according to the embodiment is described based on FIG. 7.

As mentioned above, the image capturing device 100 according to the embodiment can be implemented by a processing device such as a computer. As illustrated in FIG. 7, the image capturing device 100 includes a CPU (Central Processing Unit) 901, a ROM (Read Only Memory) 902, a RAM (Random Access Memory) 903 and a host bus 904a. Furthermore, the image capturing device 100 includes a bridge 904, an external bus 904b, an interface 905, an input device 906, an output device 907, a storage (HDD) 908, a drive 909, a connection port 911 and a communication device 913.

The CPU 901 functions as a processing device and a control device, and controls overall operations inside the image capturing device 100 according to various programs. Moreover, the CPU 901 may be a microprocessor. The ROM 902 stores programs used by the CPU 901, operation parameters and the like. The RAM 903 temporarily stores programs used for performance of the CPU 901, parameters and the like appropriately changing during such performance. These are connected to one another via the host bus 904a constituted of a CPU bus and the like.

The host bus 904a is connected to an external bus 904b such as a PCI (Peripheral Component Interconnect/Interface) bus via the bridge 904. In addition, the host bus 904a, bridge 904 and external bus 904b are not necessarily configured separately, but these functions may be implemented into one bus.

The input device 906 is configured of input instruments such as a mouse, a keyboard, a touch panel, buttons, a microphone, switches, levers which an instrument is for the user inputting information, input control circuits which generate input signals based on the input from the user and output them to the CPU 901 and the like. The output device 907 includes a display device such, for example, as a liquid crystal display (LCD) device, an OLED (Organic Light Emitting Diode) device and a lamp, and a voice output device such as a loud speaker.

The storage 908 is one example of the storage of the image capturing device 100, and is a device for storing data. The storage 908 may include a storing medium, a recording device recording data in the storing medium, a readout device reading out data from the storing medium, a deleting device deleting data recorded in the storing medium and the like. The storage 908 is configured of an HDD (Hard Disk Drive), for example. This storage 908 drives the hard disk drive, and stores programs executed by the CPU 901 and various kinds of data.

The drive 909 is a storing medium reader/writer, and is built in the image capturing device 100 or is provided externally. The drive 909 reads out information recorded in a mounted removable recording medium such as a magnetic disk, an optical disk, a magneto-optical disk or a semiconductor memory to output it to the RAM 903.

The connection port 911 is an interface connected to external equipment, and is a connection port to external equipment to which data can be transmitted via a USB (Universal Serial Bus) and the like, for example. Moreover, the communication device 913 is a communication interface configured of a communication device and the like for connecting to a communication network 5, for example. Moreover, the communication device 913 may be a communication device compatible with a wireless LAN (Local Area Network) or a communication device compatible with a wireless USB or a wired communication device communicating in a wired manner.

It should be understood by those skilled in the art that various modifications, combinations, sub-combinations and alterations may occur depending on design requirements and other factors insofar as they are within the scope of the appended claims or the equivalents thereof.

For example, configuring constituents of image quality for each scene is described in the above-mentioned embodiments, whereas the present disclosure is not limited to such examples. For example, preference of image quality for each scene for a plurality of users may be configured. In this case, setting information of image quality for each scene is managed for each user in the image quality storage 109. Moreover, at the beginning of use of the image capturing device 100, user information of the relevant device is allowed to be inputted. Thereby, when acquiring setting information corresponding to a recognized scene from the image quality storage 109, the image recognition block 103 can acquire setting information of image quality corresponding to the user of the image capturing device 100.

Moreover, in the above-mentioned embodiments, the image recognition block 103 recognizing a scene for which an image is captured, the image processing block 104, the image quality configuring part 108 configuring image quality for each scene, and the image quality storage 109 storing setting information of image quality for each scene are provided in the body of the image capturing device 100. However, the present disclosure is not limited to such an example, but at least one of these functional parts may be provided in an information processing device separate from the image capturing device 100, and performance of processing and management of information may be performed therein. Moreover, processing of these functional parts may be performed in a server which can communicate via a network, and receiving processing results from the relevant server, the image capturing device 100 side may perform image processing and camera control based on the processing results.

Additionally, the present technology may also be configured as below.

(1) An image processing device including:
an image quality configuring part configured to configure image quality on a per-recognizable scene of an image basis according to an instruction from a user;
an image quality storage configured to store the image quality configured for each scene;
an image recognition part configured to recognize a scene of an image to be acquired; and
an image processing part configured to perform image processing on the image based on the image quality configured for the recognized scene by the image quality configuring part.

(2) The image processing device according to (1),
wherein the image quality configuring part is configured to include
a constituent configuring part configured to configure at least one constituent of image quality for each recognizable scene, and
a configuration processing part configured to display a representative image for each scene in the configured image quality.

(3) The image processing device according to (2),
wherein the configuration processing part is configured to display a plurality of changing candidate images obtained by changing a setting value for the constituent of image quality, and is configured to determine a setting value of a changing candidate image selected from the plurality of changing candidate images as a setting value for the constituent of image quality.

(4) The image processing device according to (3),
wherein the configuration processing part is configured to arrange and display, into a matrix shape, a plurality of changing candidate images obtained by changing setting values for two constituents of image quality.

(5) The image processing device according to any one of (2) to (4),
wherein the configuration processing part is configured to update the representative image in real time based on a setting value configured by the constituent configuring part.
(6) The image processing device according to any one of (1) to (5), further including:
an image capturing part configured to capture an image,
wherein an image on which the image processing part is configured to perform image processing is the image captured by the image capturing part.

The present disclosure contains subject matter related to that disclosed in Japanese Priority Patent Application JP 2012-024775 filed in the Japan Patent Office on Feb. 8, 2012, the entire content of which is hereby incorporated by reference.

What is claimed is:

1. An image processing device comprising:
an image quality configuring part configured to configure image quality of a recognizable scene of an image according to an instruction from a user;
an image quality storage configured to store the image quality configured for the recognizable scene;
an image recognition part configured to recognize a scene of an image to be acquired; and
an image processing part configured to perform image processing on the image to be acquired based on the image quality configured by the image quality configuring part for the scene recognized by the image recognition part, wherein the image quality comprises at least one constituent for the recognizable scene, and
wherein a setting value for the at least one constituent of the image quality is determined based on a setting value of a changing candidate image selected from a displayed plurality of changing candidate images.

2. The image processing device according to claim 1, wherein the image quality configuring part comprises:
a configuration processing part configured to display a representative image for the recognizable scene in the configured image quality.

3. The image processing device according to claim 2, wherein the configuration processing part is configured to update the representative image in real time based on the setting value configured by the image quality configuring part.

4. The image processing device according to claim 1, further comprising:
an image capturing part configured to capture an image, wherein the image to be acquired on which the image processing part is configured to perform image processing is the image captured by the image capturing part.

5. An image processing device, comprising:
an image quality configuring part configured to configure image quality of a recognizable scene of an image according to an instruction from a user;
an image quality storage configured to store the image quality configured for the recognizable scene;
an image recognition part configured to recognize a scene of an image to be acquired; and
an image processing part configured to perform image processing on the image to be acquired based on the image quality configured by the image quality configuring part for the scene recognized by the image recognition part, wherein the image quality configuring part comprises:
a constituent configuring part configured to configure at least one constituent of the image quality for each the recognizable scene, and
a configuration processing part configured to display a representative image for the recognizable scene in the configured image quality, and
wherein the configuration processing part is configured to display a plurality of changing candidate images obtained by changing a setting value for the at least one constituent of the image quality, and is configured to determine a setting value of a changing candidate image selected from the plurality of changing candidate images as the setting value for the at least one constituent of the image quality.

6. The image processing device according to claim 5, wherein the configuration processing part is configured to arrange and display in a matrix shape, the plurality of changing candidate images obtained by changing the setting value for two constituents of image quality.

7. An image processing method comprising:
configuring image quality of a recognizable scene of an image according to an instruction from a user;
configuring at least one constituent of the image quality for the recognizable scene;
displaying a representative image for the recognizable scene in the configured image quality;
displaying a plurality of changing candidate images obtained by changing a setting value for the at least one constituent of image quality;
determining a setting value of a changing candidate image selected from the plurality of changing candidate images as a setting value for the at least one constituent of image quality;
recognizing a scene of an image to be acquired; and
performing image processing on the image based on the setting value of the at least one constituent of the image quality configured for the recognized scene.

8. A non-transitory computer-readable recording medium having instructions recorded therein which, when executed by a processor, cause the processor to function as an image processing device including:
an image quality configuring part configured to:
configure image quality of a recognizable scene of an image according to an instruction from a user, and
record the image quality in an image quality storage configured to store the image quality configured for the recognizable scene;
an image recognition part configured to recognize a scene of an image to be acquired; and
an image processing part configured to perform image processing on the image to be acquired based on the image quality configured by the image quality configuring part for the scene recognized by the image recognition part, wherein the image quality comprises at least one constituent for the recognizable scene, and
wherein a setting value for the at least one constituent of the image quality is determined based on a setting value of a changing candidate image selected from a displayed plurality of changing candidate images.

9. The image processing method according to claim 8, further comprising:
arranging and displaying in a matrix shape, the plurality of changing candidate images obtained by changing setting values for two constituents of the image quality.

10. The image processing method according to claim 8, further comprising updating the representative image in real time based on the setting value for the at least one constituent of the image quality.

11. A non-transitory computer-readable recording medium having instructions recorded therein which, when executed by a processor of an image processing device, cause the processor to cause the image processing device to perform an image processing method comprising:
 configuring image quality of a recognizable scene of an image according to an instruction from a user;
 configuring at least one constituent of the image quality for the recognizable scene;
 displaying a representative image for the recognizable scene in the configured image quality;
 displaying a plurality of changing candidate images obtained by changing a setting value for the at least one constituent of image quality;
 determining a setting value of a changing candidate image selected from the plurality of changing candidate images as a setting value for the at least one constituent of image quality;
 recognizing a scene of an image to be acquired; and
 performing image processing on the image based on the setting value of the at least one constituent of the image quality configured for the recognized scene.

12. The computer-readable medium according to claim 11, wherein configuring image quality further comprises:
 arranging and displaying, into a matrix shape, the plurality of changing candidate images obtained by changing setting values for two constituents of image quality.

13. The computer-readable medium according to claim 11, wherein configuring image quality further comprises:
 updating the representative image in real time based on the setting value for the at least one constituent of image quality.

\* \* \* \* \*